UNITED STATES PATENT OFFICE.

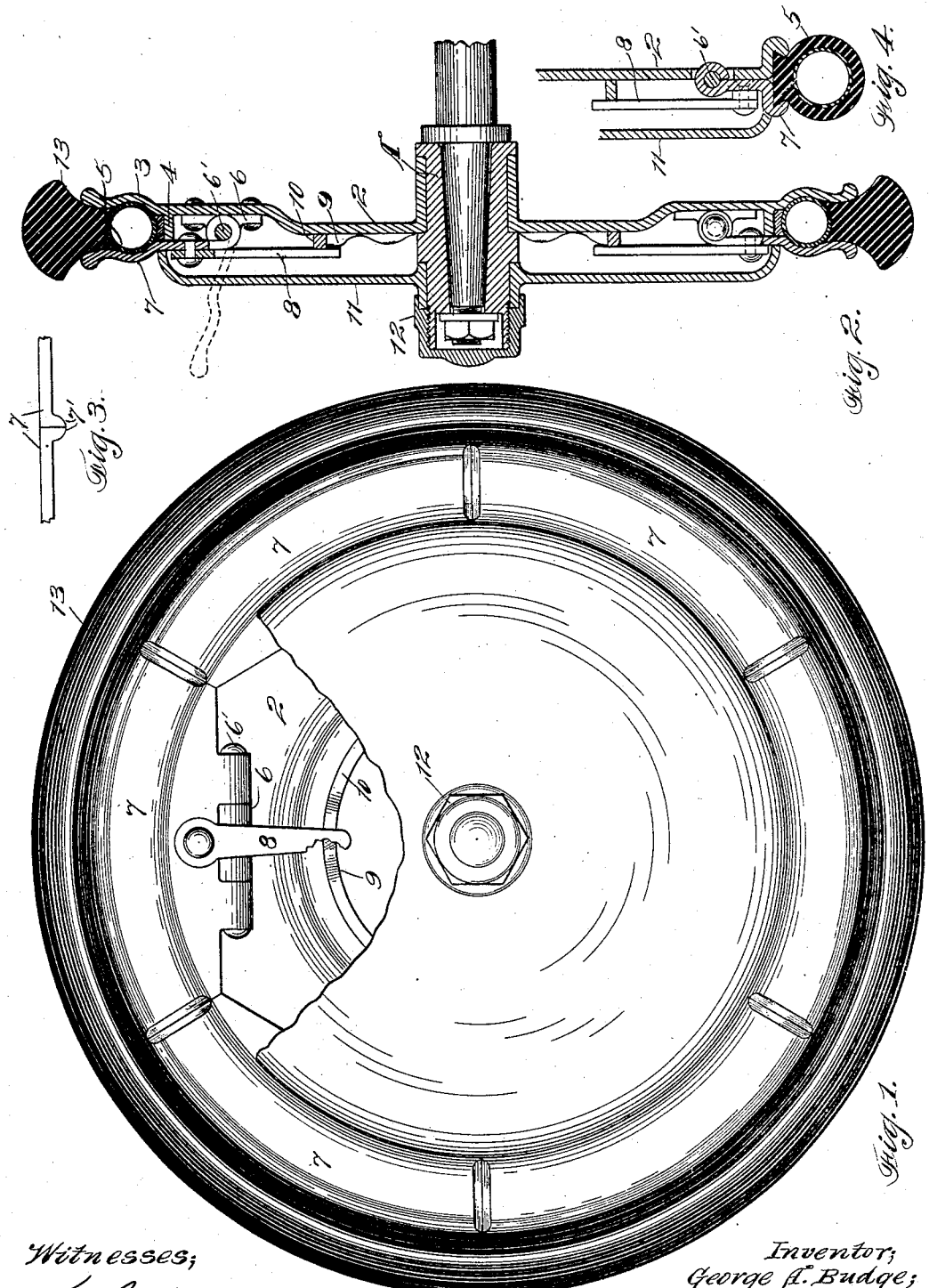

GEORGE A. BUDGE, OF OAKLAND, CALIFORNIA, ASSIGNOR OF ONE-HALF TO JOHN T. RYAN, OF VALLEJO, CALIFORNIA.

VEHICLE-WHEEL.

No. 908,442.     Specification of Letters Patent.     Patented Jan. 5, 1909.

Application filed September 13, 1907. Serial No. 392,736.

*To all whom it may concern:*

Be it known that I, GEORGE A. BUDGE, citizen of Great Britain, residing at Oakland, in the county of Alameda and State of California, have invented new and useful Improvements in Vehicle-Wheels, of which the following is a specification.

My invention relates to vehicle wheels, and especially those wheels designed for the use of automobiles and the like.

The object of the invention is to provide primarily a shock-absorbing wheel without the use of the usual destructible pneumatic tires running on the roadway. Its further object is to provide a simple form of detachable rim or tire-gripping device, which may be used not only in conjunction with my particular wheel, but may be adapted for ordinary pneumatic tires and outer casing.

The invention comprehends essentially a rim member with hinged coacting clamp-jaw elements for the reception and ready securing of a pneumatic tire between them. All this will be explained by reference to the accompanying drawings, in which—

Figure 1 is a side elevation of the wheel partly broken away. Fig. 2 is a vertical sectional view thereof. Fig. 3 is a detail view of a portion of the clamp. Fig. 4 is a modified form.

A represents a hub to which is fixedly secured the annular plate or disk 2. This disk is of nearly the same diameter as the wheel, and is provided near its periphery with an annular concaved seating portion 3, which forms the fixed jaw member of my tire or tube-clamping means. On the inside of the disk 2, proximate to the seat 3, is the annular flange 4, forming a bottom seat and support for a tire or tube 5. Inside of the flange 4 are lugs 6, arranged in pairs at suitable intervals and secured to, or made integral with, the plate 2, which latter forms practically the spokes of the wheel.

Hinged between the lugs are the movable clamp members 7 having the arms or handles 8. These clamp members 7 are segmental in form, and are of any suitable number, and so arranged circumferentially, one with respect to the other, as to extend clear around the plate 2, and are adapted to coöperate with the fixed jaw member or seat 3 to grip the tire. The several handles 8 are pivoted to the respective clamp members 7 to swing in a plane at right angles to the plane of oscillation of the members 7, for the purpose of allowing the handles to ride up and down the cam surfaces or undulations 9 on the annular cam flange 10. The latter is carried by the plate 2 at some suitable point between the hub and the pivots 6' of the members 7.

The abutting edges of the several segmental clamp members are preferably thickened, as shown at 7', so as to insure their proper alining, and prevent any possibility of their overlapping one another.

The housing plate or disk 11 is slidable lengthwise of the hub on the inside of the wheel; and this plate 11, when moved up and secured by the lock-nut 12, will suitably house the parts to prevent ingress of dirt, and give a neat appearance to the wheel.

The tube 5 that is gripped by the members 3—7 may be the tire which runs upon the roadway, as seen in Fig. 4; or, as shown in Fig. 2, it may form an inner cushion to an outer and non-puncturable tire or tread member 13, which is suitably shaped so as to be gripped also between the jaw members 3—7.

It is possible that various changes and modifications may be made in the details of construction of the invention, without departing from the principle thereof.

Having thus described my invention, what I claim and desire to secure by Letters Patent is—

1. In a vehicle wheel, a tire-securing means, consisting of a support for one side of the tire, hinged coöperating clamping segments for the opposite side of the tire, and projections on the segments and coacting projections on the support, for holding the segments in closed position against the tire.

2. In a vehicle wheel, a rim portion, comprising a stationary annular seat for one side of the tire, and a hinged coöperating seat portion for the opposite side of the tire, and means comprising an arm connected with the hinged seat-portion and a cam surface connected with the stationary seat-portion adapted to be engaged by the arm to hold the hinged seat-portion in its closed position.

3. In a vehicle wheel, a hub, a spoke element secured to the hub, said spoke element having a fixed seat portion for one side of the tire, and hinged coacting seat elements for the other side of the tire carried by said spoke element, with means for tightening and loosening said hinged elements, said means comprising arms projecting from the hinged seat elements and projections connected with the spoke element adapted to be engaged by said arms to hold the hinged elements in closed position.

4. In a vehicle wheel, the combination with a hub of an annular plate forming a spoke element, said plate carrying a seat for one side of the tire, and having an undulating cam concentric with its axis, and segmental clamp members hinged to the plate constituting a seat for the opposite side of the tire, said clamp members having projecting arms adapted to be forced over the elevations of said cam to lock the clamp members in position against the tire.

5. In a vehicle wheel, the combination with a hub of an annular plate forming a spoke element, said plate carrying a seat for one side of the tire, and segmental clamp members hinged to the plate constituting a seat for the opposite side of the tire, said clamp members having their abutting edges thickened to prevent their overlapping.

6. In a vehicle wheel, the combination with a hub of an annular plate forming a spoke element, said plate carrying a seat for one side of the tire, segmental clamp members hinged to the plate constituting a seat for the opposite side of the tire, arms on said clamp members hinged to turn transverse to the plane of oscillation of the members, and an undulating cam with which said arms coöperate to actuate the clamps to grip the tire.

7. In a vehicle wheel, the combination with a hub of an annular plate forming a spoke element, said plate carrying a seat for one side of the tire, segmental clamp members hinged to the plate constituting a seat for the opposite side of the tire, arms on said clamp members hinged to turn transverse to the plane of oscillation of the members, an undulating cam with which said arms coöperate to actuate the clamps to grip the tire, and a movable housing plate on the hub inclosing said clamp operating means.

In testimony whereof I have hereunto set my hand in presence of two subscribing witnesses.

GEORGE A. BUDGE.

Witnesses:
S. H. NOURSE,
FREDERICK E. MAYNARD.